US012394943B2

(12) United States Patent
Wang et al.

(10) Patent No.: US 12,394,943 B2
(45) Date of Patent: Aug. 19, 2025

(54) ELECTRICAL RECEPTACLE CONNECTOR WITH INNER AND OUTER METALLIC SHELLS

(71) Applicant: ADVANCED-CONNECTEK INC., New Taipei (TW)

(72) Inventors: Shu-Fen Wang, New Taipei (TW); Yu-Chai Yeh, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 385 days.

(21) Appl. No.: 17/950,730

(22) Filed: Sep. 22, 2022

(65) Prior Publication Data

US 2023/0099327 A1 Mar. 30, 2023

(30) Foreign Application Priority Data

Sep. 24, 2021 (TW) ................................ 110211292

(51) Int. Cl.
*H01R 13/6583* (2011.01)

(52) U.S. Cl.
CPC ................................ *H01R 13/6583* (2013.01)

(58) Field of Classification Search
CPC ..... H01R 13/6583; H01R 13/658; H01R 4/64
See application file for complete search history.

(56) References Cited

U.S. PATENT DOCUMENTS

| | | | | |
|---|---|---|---|---|
| 9,093,797 | B2 * | 7/2015 | Zhao | H01R 13/6593 |
| 9,106,024 | B2 * | 8/2015 | Zhao | H01R 13/6594 |
| 9,583,873 | B2 * | 2/2017 | Wang | H01R 13/703 |
| 9,640,923 | B2 * | 5/2017 | Kao | H01R 24/60 |
| 9,935,401 | B2 * | 4/2018 | Tsai | H01R 13/6586 |
| 10,177,504 | B2 * | 1/2019 | Zhao | H01R 24/60 |
| 10,855,008 | B2 * | 12/2020 | Gu | H01R 13/504 |
| 2015/0044899 | A1 * | 2/2015 | Fan | H01R 13/639 439/353 |
| 2019/0221953 | A1 * | 7/2019 | Chen | H01R 13/516 |

* cited by examiner

*Primary Examiner* — Vanessa Girardi
(74) *Attorney, Agent, or Firm* — MUNCY, GEISSLER, OLDS & LOWE, P.C.

(57) ABSTRACT

An electrical receptacle connector includes a metallic shell, an outer shell, an insulated housing, and receptacle terminals. The receptacle terminals are held at the insulated housing. The metallic shell covers the insulated housing. The outer shell covers the metallic shell. The metallic shell has a reduced length to allow the exposure of the tongue portion. Elastic pieces of the outer shell extend toward the recessed holes of the metallic shell. When an electrical plug connector is mated with the electrical receptacle connector, the housing of the electrical plug connector contacts the elastic pieces of the electrical receptacle connector, so that the holding force between the electrical plug connector and the electrical receptacle connector can be increased. Hence, when the electrical plug connector is mated with the electrical receptacle connector, the high-frequency interference issue during signal transmission can be reduced.

7 Claims, 7 Drawing Sheets

ELECTRICAL RECEPTACLE CONNECTOR WITH INNER AND OUTER METALLIC SHELLS

CROSS-REFERENCE TO RELATED APPLICATION

This non-provisional application claims priority under 35 U.S.C. § 119(a) to Patent Application No. 110211292 in Taiwan, R.O.C. filed on Sep. 24, 2021, the entire contents of which are hereby incorporated by reference.

FIELD OF THE INVENTION

The instant disclosure relates to an electrical connector, and more particular to an electrical receptacle connector.

BACKGROUND

Generally, Universal Serial Bus (USB) is a serial bus standard to the PC architecture with a focus on computer interface, consumer, and productivity applications. The existing Universal Serial Bus (USB) interconnects have the attributes of plug-and-play and ease of use by end users. Now, as technology innovation marches forward, new kinds of devices, media formats and large inexpensive storage are converging. They require significantly more bus bandwidth to maintain the interactive experience that users have come to expect. In addition, the demand of a higher performance between the PC and the sophisticated peripheral is increasing. The transmission rate of USB 2.0 is insufficient. As a consequence, faster serial bus interfaces such as USB 3.0, are developed, which may provide a higher transmission rate so as to satisfy the need of a variety devices.

SUMMARY OF THE INVENTION

The appearance, the structure, the contact ways of terminals, the number of terminals, the pitches between terminals (the distances between the terminals), and the pin assignment of terminals of a USB type-C electrical connector known to the inventor(s) are totally different from those of a USB electrical connector known to the inventor(s). A USB type-C electrical receptacle connector known to the inventor includes flat terminals on the plastic housing, the plastic housing is covered by a metal shell, and elastic pieces extend from the inner surface of the metal shell. When a USB type-C electrical plug connector is mated with the USB type-C electrical receptacle connector, the elastic pieces of the USB type-C electrical receptacle connector contact the housing of the USB type-C electrical plug connector. However, when the length of the metal shell is reduced, the area available for configuring the elastic pieces is also reduced. Under this condition, when a USB type-C electrical plug connector is mated with the USB type-C electrical receptacle connector having a metal shell with reduced length, the elastic pieces of the USB type-C electrical receptacle connector cannot contact the housing of the USB type-C electrical plug connector and cannot be positioned with the housing of the USB type-C electrical plug connector stably.

According to one or some embodiments, an electrical receptacle connector is provided. The electrical receptacle connector comprises a metallic shell, an outer shell, an insulated housing, and a plurality of receptacle terminals. The metallic shell comprises a receiving cavity and an insertion opening in communication with the receiving cavity. One of two sides of the metallic shell has a plurality of recessed holes. The outer shell covers the metallic shell. The outer shell has a plurality of elastic pieces. Each of the elastic pieces corresponds to a corresponding one of the recessed holes. Each of the elastic pieces extends to the receiving cavity along a direction from the outer shell toward the corresponding one of the recessed holes. The insulated housing comprises a base portion and a tongue portion. The base portion is received in the receiving cavity. One end of the tongue portion extends outwardly from one side of the base portion and is exposed out of the insertion opening. The receptacle terminals are held at the base portion and the tongue portion. One ends of the receptacle terminals are on an upper face and a lower face of the tongue portion.

In some embodiments, the other side of the metallic shell has a plurality of protruding portions, and each of the protruding portions is at an inner surface of the metallic shell and protrudes toward the receiving cavity.

In some embodiments, an inner wall of the insertion opening has a plurality of positioning portions, and each of the protruding portions is at the inner surface of the metallic shell and adjacent to a corresponding one of the positioning portions of the insertion opening.

In some embodiments, the metallic shell has a plurality of leg portions, two side walls of the outer shell have a plurality of recessed portions, and each of the leg portions extends outwardly from a corresponding one of the recessed portions.

In some embodiments, the outer shell has a plurality of limiting holes, the side of the metallic shell has a plurality of protruding blocks, and each of the protruding blocks is engaged with a corresponding one of the limiting holes.

In some embodiments, the metallic shell has a plurality of stopping blocks, and each of the stopping blocks is at an inner surface of the metallic shell and protrudes toward the receiving cavity. The insulated housing has a plurality of assembling portions, and each of the assembling portions is on the base portion. Each of the stopping blocks is on a corresponding one of the assembling portions, and a side surface of each of the stopping blocks protrudes from a side surface of the base portion.

In some embodiments, the two sides of the metallic shell have a plurality of fixing holes, two side walls of the outer shell have a plurality of engaging blocks, and each of the engaging blocks is engaged with a corresponding one of the fixing holes.

In some embodiments, the side of the metallic shell has a mating groove, the mating groove is between the recessed holes, and the outer shell covers the mating groove.

In some embodiments, each of the elastic pieces is in the receiving cavity and obliquely extends toward the insertion opening.

In some embodiments, one end of each of the receptacle terminals is exposed out of the insertion opening.

Based on the above, according to one or some embodiments of the instant disclosure, the metallic shell of the electrical receptacle connector has a reduced length, and the tongue portion is exposed out of the insertion opening. The outer shell covers the metallic shell, and the elastic pieces of the outer shell extend toward the recessed holes of the metallic shell and extend into the receiving cavity. When an electrical plug connector is mated with the electrical receptacle connector, the housing of the electrical plug connector contacts the elastic pieces of the outer shell of the electrical receptacle connector, so that the holding force between the electrical plug connector and the electrical receptacle connector can be increased. Hence, when the electrical plug connector is mated with the electrical receptacle connector, the high-frequency interference issue during signal transmission can be reduced.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
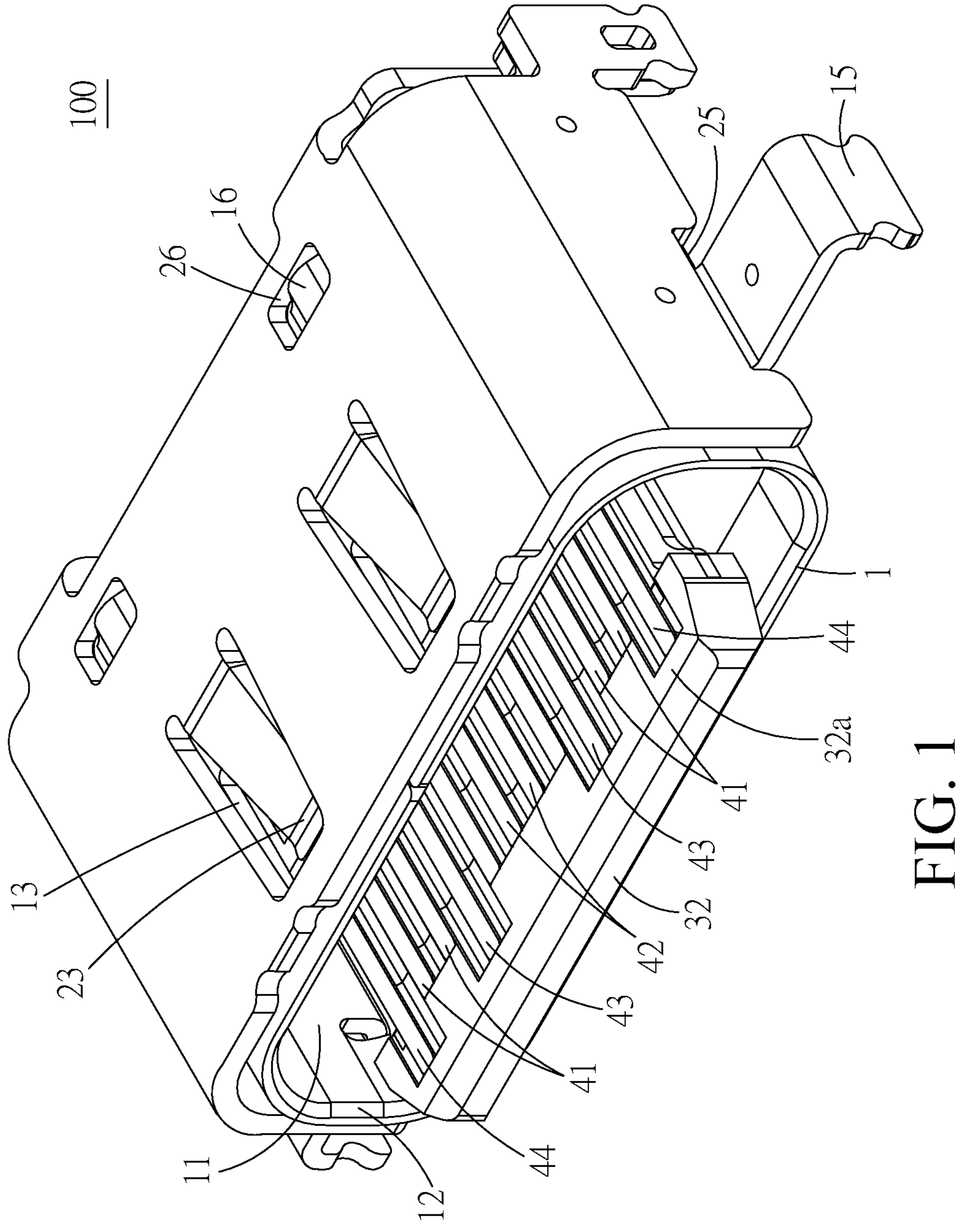
FIG. 1 illustrates a perspective view of an electrical receptacle connector according to some embodiments of the instant disclosure.

Please refer to FIG. 1. FIG. 1 illustrates a perspective view of an electrical receptacle connector 100. In some embodiments, the electrical receptacle connector 100 is in accordance with the specification of USB type-C connection interfaces, but embodiments are not limited thereto. In some embodiments, the electrical receptacle connector 100 may be in accordance with the specification of HDMI connection interfaces. In this embodiment, the electrical receptacle connector 100 comprises a metallic shell 1, an outer shell 2, an insulated housing 3, and a plurality of receptacle terminals 4.

Figure 2:
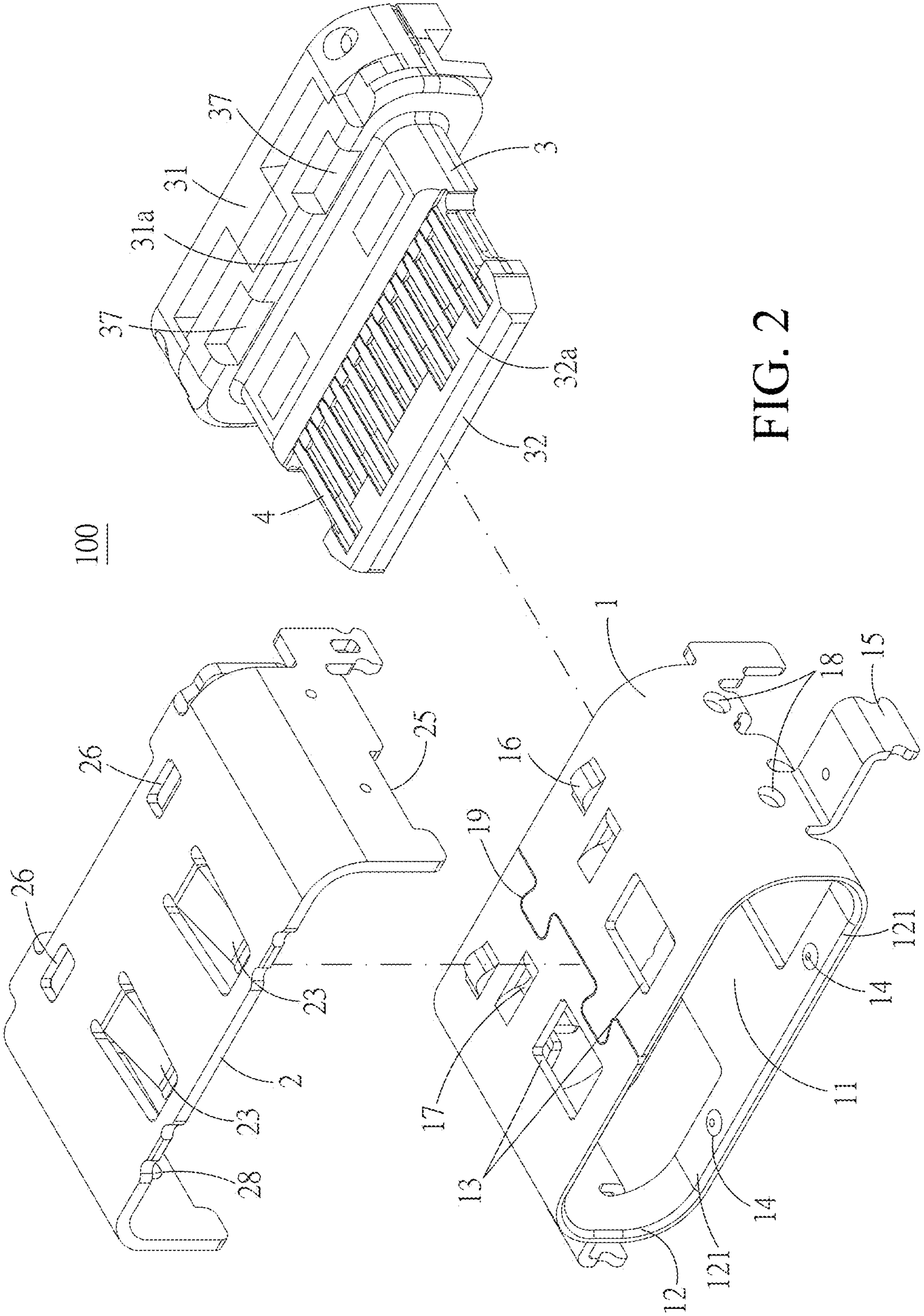
FIG. 2 illustrates a front exploded view of the electrical receptacle connector according to some embodiments of the instant disclosure.

Please refer to FIG. 2. FIG. 2 illustrates a front exploded view of the electrical receptacle connector 100. In some embodiments, the metallic shell 1 comprises a receiving cavity 11 and an insertion opening 12 in communication with the receiving cavity 11. One of two sides of the metallic shell 1 has a plurality of recessed holes 13.

Figure 3:
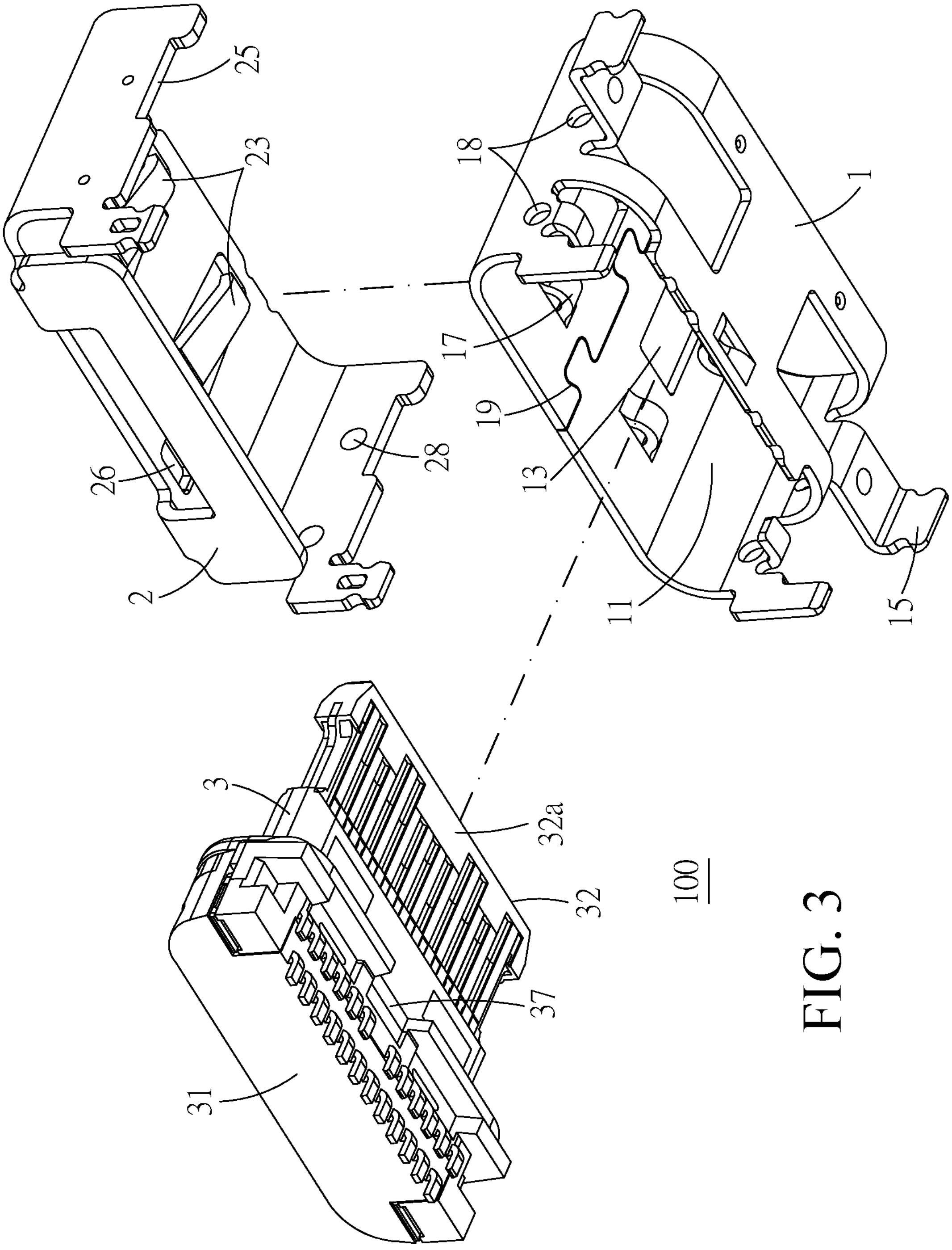
FIG. 3 illustrates a rear exploded view of the electrical receptacle connector according to some embodiments of the instant disclosure.

Please refer to FIG. 1 to FIG. 3. FIG. 3 illustrates a rear exploded view of the electrical receptacle connector 100. In some embodiments, the outer shell 2 covers the metallic shell 1. The outer shell 2 has a plurality of elastic pieces 23. Each of the elastic pieces 23 corresponds to a corresponding one of the recessed holes 13. Each of the elastic pieces 23 extends to the receiving cavity 11 along a direction from the outer shell 2 toward the corresponding one of the recessed holes 13. The insulated housing 3 comprises a base portion 31 and a tongue portion 32. The base portion 31 is received in the receiving cavity 11. One end of the tongue portion 32 extends outwardly from one side of the base portion 31 and is exposed out of the insertion opening 12.

Figure 6:
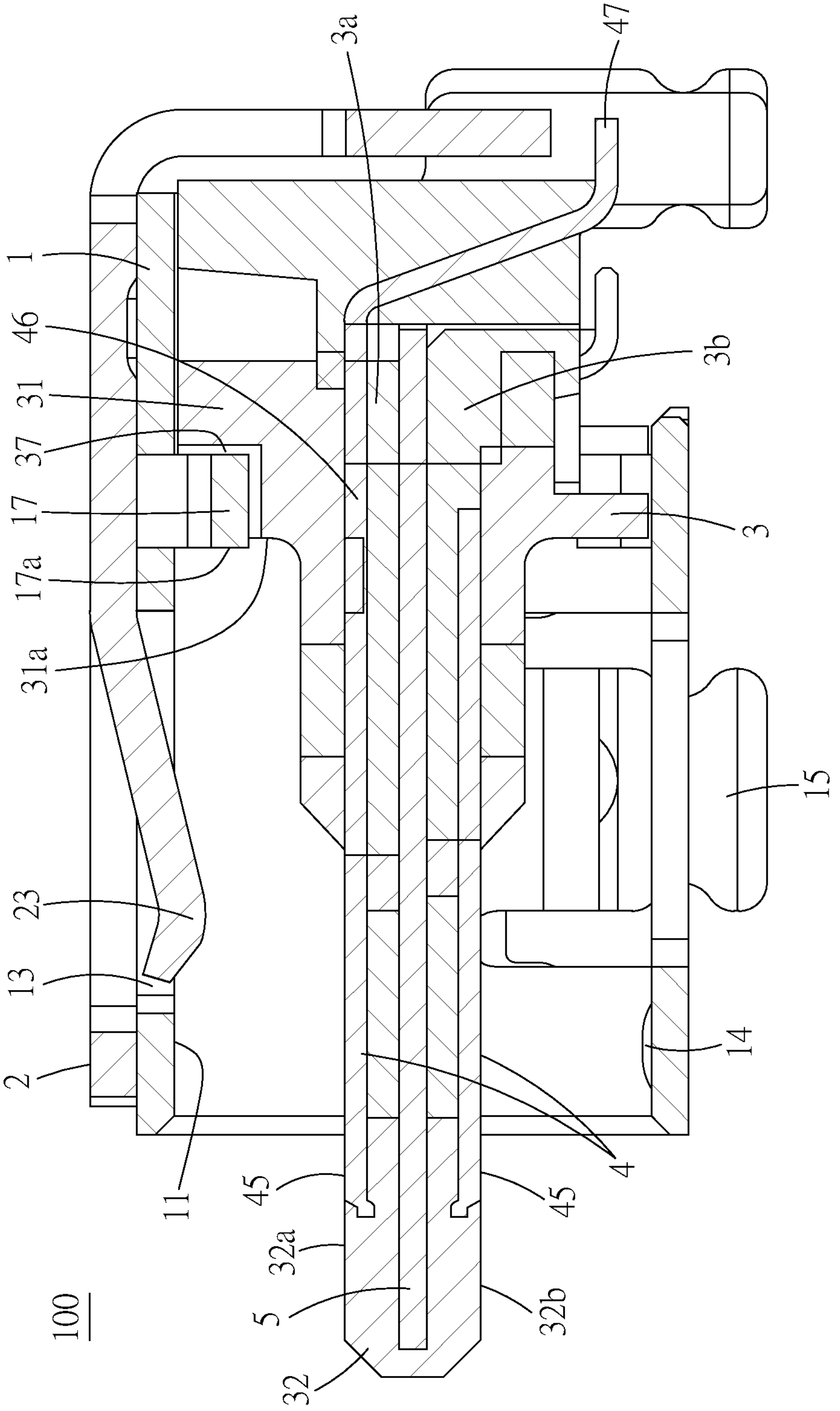
FIG. 6 illustrates a cross-sectional view of the electrical receptacle connector along the line A-A shown in FIG. 5.

The receptacle terminals 4 are held at the base portion 31 and the tongue portion 32. One ends of the receptacle terminals 4 are on an upper face **32*a* and a lower face 32*b* of the tongue portion 32 (as shown in FIG. 6**).

Hence, according to one or some embodiments of the instant disclosure, when an electrical plug connector is mated with the electrical receptacle, the housing of the electrical plug connector contacts the elastic pieces 23 of the outer shell 2 of the electrical receptacle connector 100, so that the holding force between the electrical plug connector and the electrical receptacle connector 100 can be increased. The outer shell 2 is connected to a circuit board through the metallic shell 1 for conduction and grounding. Hence, when the electrical plug connector is mated with the electrical receptacle connector 100, the high-frequency interference issue during signal transmission can be reduced.

Figure 4:
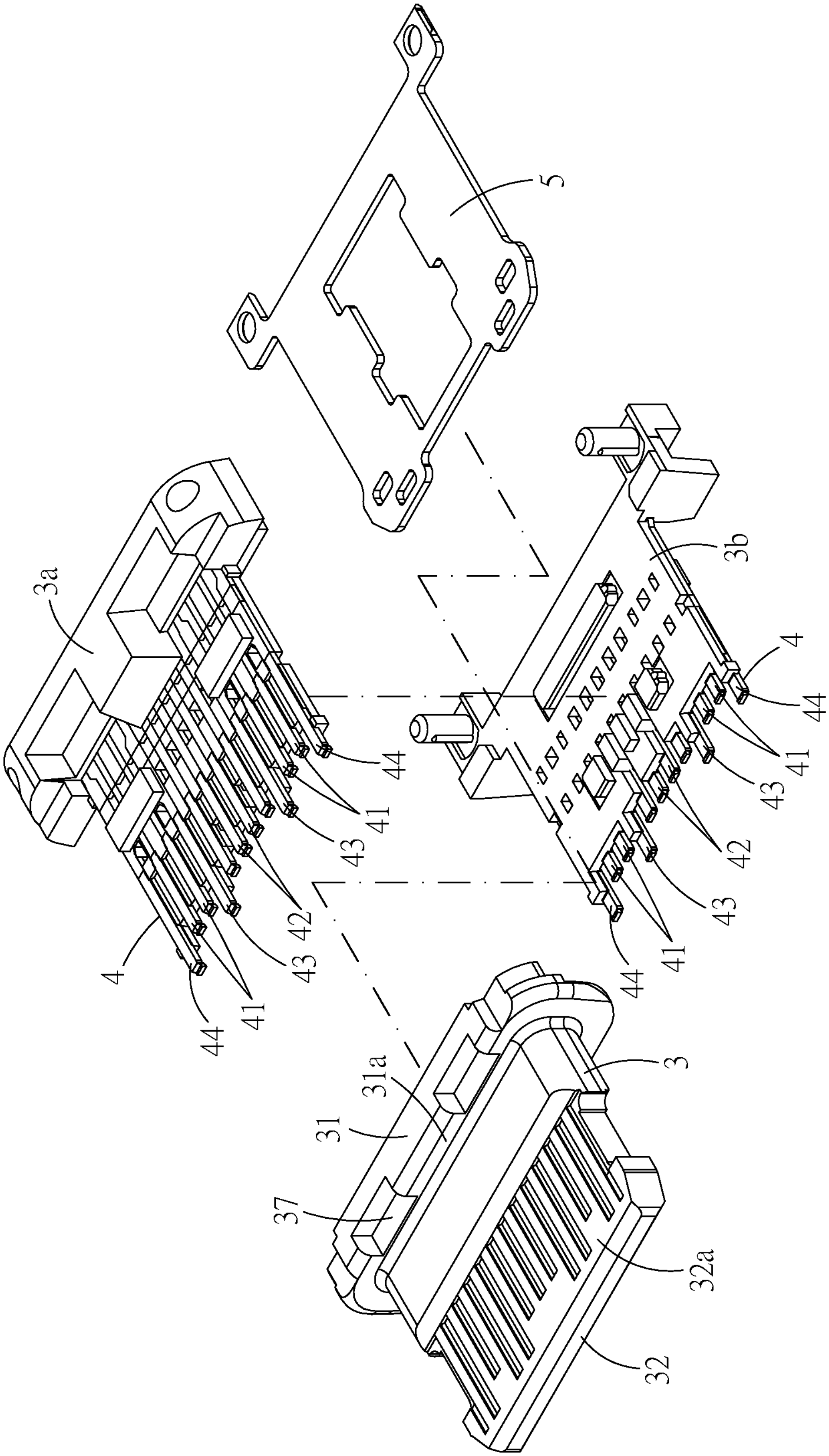
FIG. 4 illustrates an exploded view of the terminal module of the electrical receptacle connector according to some embodiments of the instant disclosure.

Please refer to FIG. 3 and FIG. 4. FIG. 4 illustrates an exploded view of the terminal module of the electrical receptacle connector 100. In some embodiments, the insulated housing 3 is an elongated member, and the insulated housing 3 may be a multi-piece structure or a one-piece structure. In this embodiment, the insulated housing 3 is a multi-piece structure as an illustrative example, and the insulated housing 3 comprises three parts to form the base portion 31 and the tongue portion 32.

Please refer to FIG. 2 to FIG. 4. In some embodiments, the receptacle terminals 4 are arranged in two rows, and the two rows are respectively held at the insulated housing 3. The receptacle terminals 4 comprise a plurality of high-speed signal terminals 41, a plurality of low-speed signal terminals 42, a plurality of power terminals 43, and a plurality of ground terminals 44. The ground terminals 44 are at two outermost sides of the power terminals 43. The low-speed signal terminals 42 are between the power terminals 43. Each of the high-speed signal terminals 41 is between an adjacent one of the power terminals 43 and an adjacent one of the ground terminals 44. One end of each of the receptacle terminals 4 is exposed out of the insertion opening 12 of the metallic shell 1. The receptacle terminals 4 comprise a plurality of contact portions 45 at the two faces (the upper face and the lower face) of the tongue portion 32.

Please refer to FIG. 2 to FIG. 4. In some embodiments, the electrical receptacle connector 100 comprises a metallic plate 5. The metallic plate 5 is at the insulated housing 3 and between the receptacle terminals 4 in the two rows (as shown in FIG. 6). Buckle structures outwardly protrude from two sides of the metallic plate 5. The buckle structures are provided for being contacted by side-latches of an electrical plug connector. Therefore, when the electrical plug connector is mated with the electrical receptacle connector 100, the side-latches at two sides of the electrical plug connector are buckled with the buckle structures of the electrical receptacle connector 100. Hence, the side-latches at the two sides of the electrical plug connector can be prevented from wearing against the two sides of the tongue portion 32 to cause the wearing and damaging of the tongue portion 32. In some embodiments, the metallic plate 5 is held at the tongue portion 32 to increase the structural strength of the tongue portion 32 and to improve the shielding performance of the tongue portion 32. In some embodiments, when signals are transmitted between the terminals of the electrical plug connector and the receptacle terminals 4 of the electrical receptacle connector 100, the contact portions 45 of the receptacle terminals 4 of the electrical receptacle connector 100 can be isolated from each other by the metallic plate 5 to reduce the crosstalk signal interferences upon signal transmission. Moreover, the metallic plate 5 is at the tongue portion 32 to increase the structural strength of the tongue portion 32.

Please refer to FIG. 2 to FIG. 4. In some embodiments, the receptacle terminals 4 at the upper row and a first insulated member 3*a* are formed with each other by insert-molding to form a first part, and the receptacle terminals 4 at the lower row and a second insulated member 3*b* are formed with each other by insert-molding, and then the metallic plate 5 is assembled on the second insulated member 3*b* to form a second part. Then, the first part and the second part are combined with each other.

Please refer to FIG. 2 to FIG. 4. In some embodiments, the receptacle terminals 4 comprise body portions 46 and tail portions 47. The body portions 46 are held at the first insulated member 3*a* or the second insulated member 3*b*. Each of the contact portions 45 extends from one of two ends of a corresponding one of the body portions 46 and at one or the other of the two faces of the tongue portion 22. Each of the tail portions 47 extends from the other end of a corresponding one of the body portions 46 and protrudes from a rear portion of the first insulated member 3*a* or a rear portion of the second insulated member 3*b* (as shown in FIG. 6). The tail portions 47 are aligned horizontally to form flat legs (SMT (surface mount technology) legs which can be soldered or mounted on the surface of a circuit board using surface mount technology).

Please refer to FIG. 2 to FIG. 4. In some embodiments, the pin arrangement of the receptacle terminals 4 at the upper row of the tongue portion 32 shown in FIG. 4 is, from left to right, a ground terminal 44 (Gnd), a first pair of high-speed signal terminals 41 (TX1+−, differential signal terminals for high-speed signal transmission), a power terminals 43 (Power/VBUS), a function detection terminal (CC1, a terminal for inserting orientation detection of the connector and for cable recognition), a pair of low-speed signal terminals 42 (D+−, differential signal terminals for low-speed signal transmission), a reserved terminal (SBU1, which may be defined to provide other purposes), another power terminal 43 (Power/VBUS), a second pair of high-speed signal terminals 41 (RX2+−, differential signal terminals for high-speed signal transmission), and another ground terminal 44 (Gnd). In this embodiment, twelve receptacle terminals 4 are provided at the upper row of the tongue portion 32 for transmitting USB 3.0 signals.

Please refer to FIG. 2 to FIG. 4. In some embodiments, the pin arrangement of the receptacle terminals 4 at the lower row of the tongue portion 32 shown in FIG. 4 is, from right to left, a ground terminal 44 (Gnd), a first pair of high-speed signal terminals 41 (TX2+−, differential signal terminals for high-speed signal transmission), a power terminals 43 (Power/VBUS), a function detection terminal (CC2, a terminal for inserting orientation detection of the connector and for cable recognition), a pair of low-speed signal terminals 42 (D+−, differential signal terminals for low-speed signal transmission), a reserved terminal (SBU2, which may be defined to provide other purposes), another power terminal 43 (Power/VBUS), a second pair of high-speed signal terminals 41 (RX1+−, differential signal terminals for high-speed signal transmission), and another ground terminal 44 (Gnd). In this embodiment, twelve receptacle terminals 4 are provided at the lower row of the tongue portion 32 for transmitting USB 3.0 signals.

In some embodiments, when signals are transmitted between the terminals of the electrical plug connector and the receptacle terminals 4 of the electrical receptacle connector 100, the receptacle terminals 4 of the electrical receptacle connector 100 in two rows can be isolated from each other by the metallic plate 5 to reduce the crosstalk signal interferences upon signal transmission. Moreover, the pins of the metallic plate 5 are provided for connecting to a circuit board for conduction and grounding. The metallic plate 5 is at the tongue portion 32 to increase the structural strength of the tongue portion 32.

Figure 5:
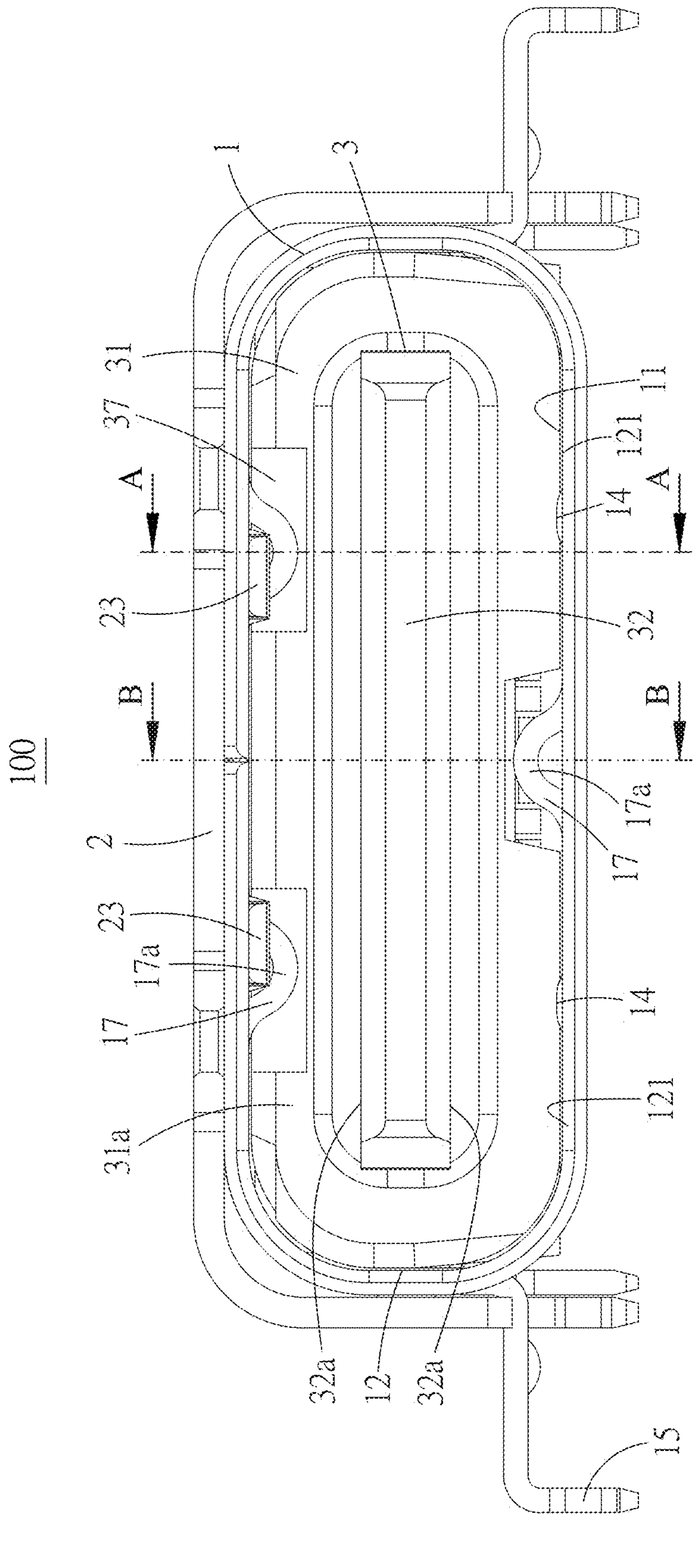
FIG. 5 illustrates a front plan view of the electrical receptacle connector according to some embodiments of the instant disclosure.
Figure 7:
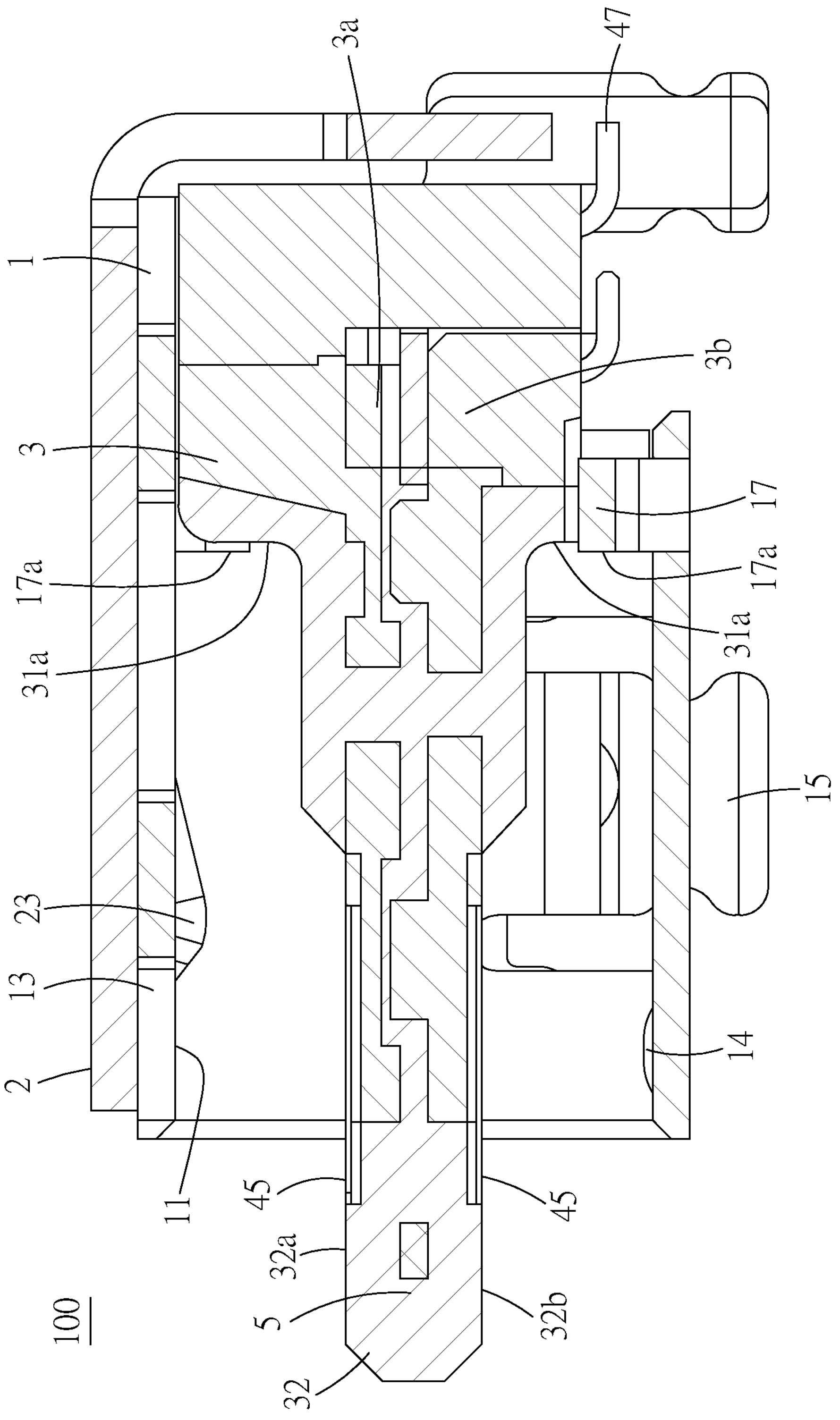
FIG. 7 illustrates a cross-sectional view of the electrical receptacle connector along the line B-B shown in FIG. 5.

Please refer to FIG. 5 to FIG. 7. FIG. 5 illustrates a front plan view of the electrical receptacle connector 100. FIG. 6 illustrates a cross-sectional view of the electrical receptacle connector 100 along the line A-A shown in FIG. 5. FIG. 7 illustrates a cross-sectional view of the electrical receptacle connector 100 along the line B-B shown in FIG. 5. In some embodiments, the metallic shell 1 is a hollow shell. The metallic shell 1 covers the insulated housing 3. The base portion 31 of the insulated housing 3 is in the receiving cavity 11. The insertion opening 12 is formed at one end of the metallic shell 1 and the insertion opening 12 surrounds the tongue portion 32 (as shown in FIG. 5). In some embodiments, each of the elastic pieces 23 of the outer shell 2 is in the receiving cavity 11 and obliquely extends toward the insertion opening 12. In some other embodiments, each of the elastic pieces 23 extends obliquely along a direction away from the insertion opening 12. In some other embodiments, each of the elastic pieces 23 extends vertically toward the receiving cavity 11, rather than extending obliquely.

Please refer to FIG. 2 and FIG. 6. In some embodiments, the other side of the metallic shell 1 has a plurality of protruding portions 14 (in this embodiment, round protruding structures). Each of the protruding portions 14 is at an inner surface of the metallic shell 1 and protrudes toward the receiving cavity 11. When an electrical plug connector is mated with the electrical receptacle connector 100, the housing of the electrical plug connector contacts the protruding portions 14 of the metallic shell 1 of the electrical receptacle connector 100, so that the holding force between the electrical plug connector and the electrical receptacle connector 100 can be increased. In some embodiments, an inner wall of the insertion opening 12 has a plurality of positioning portions 121, and each of the protruding portions 14 is at the inner surface of the metallic shell 1 and adjacent to a corresponding one of the positioning portions 121 of the insertion opening 12, but embodiments are not limited thereto. In some embodiments, each of the protruding portions 14 may be at the inner surface of the metallic shell 1 and away from the insertion opening 12.

Please refer to FIG. 2 and FIG. 3. In some embodiments, the metallic shell 1 has a plurality of leg portions 15. The leg portions 15 extend outwardly from the two sides of the metallic shell 1. Two side walls of the outer shell 2 have a plurality of recessed portions 25. A width of each of the leg portions 15 is less than a width of a corresponding one of the recessed portions 25. Each of the leg portions 15 extends outwardly from the corresponding one of the recessed portions 25 and is soldered on a circuit board.

Please refer to FIG. 2 and FIG. 3. In some embodiments, the outer shell 2 is a U-shaped structure. The outer shell 2 has a plurality of limiting holes 26. One side of the metallic shell 1 has a plurality of protruding blocks 16. Each of the protruding blocks 16 is engaged with a corresponding one of the limiting holes 26. Therefore, the fixation between the outer shell 2 and the metallic shell 1 can be improved.

Please refer to FIG. 6 and FIG. 7. In some embodiments, the metallic shell 1 has a plurality of stopping blocks 17, and each of the stopping blocks 17 is at the inner surface of the metallic shell 1 and protrudes toward the receiving cavity 11. The insulated housing 3 has a plurality of assembling portions 37, and each of the assembling portions 37 is on the base portion 31. Each of the stopping blocks 17 is on a corresponding one of the assembling portions 37, and a side surface 17*a* of each of the stopping blocks 17 protrudes from a side surface 31*a* of the base portion 31. When an electrical plug connector is mated with the electrical receptacle connector 100, the front end of the housing of the electrical plug connector contacts the side surfaces 17*a* of the stopping blocks 17. Therefore, through the stopping of the stopping blocks 17, the front end of the housing of the electrical plug connector can be prevented from contacting the side surface 31*a* of the base portion 31. Hence, the front end of the housing of the electrical plug connector can be prevented from impacting the base portion 31 to damage the base portion 31.

Please refer to FIG. 2 and FIG. 3. In some embodiments, the two sides of the metallic shell 1 have a plurality of fixing holes 18. Two side walls of the outer shell 2 have a plurality of engaging blocks 28. Each of the engaging blocks 28 is engaged with a corresponding one of the fixing holes 18. Therefore, the fixation between the outer shell 2 and the metallic shell 1 can be improved.

Please refer to FIG. 2 and FIG. 3. In some embodiments, one side of the metallic shell 1 has a mating groove 19. In these embodiments, the metallic shell 1 is formed by bending and folding a flat plate, so that the dovetail-shaped grooves and protrusions at two ends of the flat plate are mated with each other, and the mating groove 19 is formed between the dovetail-shaped grooves and protrusions. The mating groove 19 is between the recessed holes 13, and the outer shell 2 covers the mating groove 19. Therefore, when the side of the metallic shell 1 having the mating groove 19 is pushed by the electrical plug connector, owing that the outer shell 2 covers the side of the metallic shell 1 having the mating groove 19, the mating groove 19 of the metallic shell 1 can be prevented from being opened.

Please refer to FIG. 1, FIG. 6, and FIG. 7. In some embodiments, the length of the metallic shell 1 is reduced to allow the exposure of the tongue portion 32, and the tongue portion 32 is exposed out of the insertion opening 12.

Based on the above, according to one or some embodiments of the instant disclosure, the metallic shell of the electrical receptacle connector has a reduced length, and the tongue portion is exposed out of the insertion opening. The outer shell covers the metallic shell, and the elastic pieces of the outer shell extend toward the recessed holes of the metallic shell and extend into the receiving cavity. When an electrical plug connector is mated with the electrical receptacle connector, the housing of the electrical plug connector contacts the elastic pieces of the outer shell of the electrical receptacle connector, so that the holding force between the electrical plug connector and the electrical receptacle connector can be increased. Hence, when the electrical plug connector is mated with the electrical receptacle connector, the high-frequency interference issue during signal transmission can be reduced.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electrical receptacle connector, comprising:

a metallic shell comprising a receiving cavity;

an insertion opening in communication with the receiving cavity;

a plurality of protruding blocks;

a plurality of stopping blocks; and a plurality of fixing holes, wherein one of two sides of the metallic shell has a plurality of recessed holes, each of the stopping blocks is at an inner surface of the metallic shell and protrudes toward the receiving cavity, the plurality of fixing holes are on the two sides of the metallic shell, and the stopping blocks is positioning between the protruding blocks and the recessed holes;

an outer shell covering the metallic shell, wherein the outer shell has a plurality of elastic pieces, a plurality of limiting holes, and a plurality of engaging blocks, wherein each of the elastic pieces corresponds to a corresponding one of the recessed holes, and each of the elastic pieces extends to the receiving cavity along a direction from the outer shell toward the corresponding one of the recessed holes, each of the protruding blocks is engaged with a corresponding one of the limiting holes, the plurality of engaging blocks are at two side walls of the outer shell, and each of the engaging blocks is engaged with a corresponding one of the fixing holes;

an insulated housing comprising a base portion, a tongue portion, and a plurality of assembling portions, wherein the base portion is received in the receiving cavity, and one end of the tongue portion extends outwardly from one side of the base portion and is exposed out of the insertion opening, each of the assembling portions is on the base portion, each of the stopping blocks is on a corresponding one of the assembling portions, and a side surface of each of the stopping blocks protrudes from a side surface of the base portion;

a plurality of receptacle terminals held at the base portion and the tongue portion, wherein one ends of the receptacle terminals are on an upper face and a lower face of the tongue portion.

2. The electrical receptacle connector according to claim 1, wherein an other side of the metallic shell has a plurality of protruding portions, and each of the protruding portions is at an inner surface of the metallic shell and protrudes toward the receiving cavity.

3. The electrical receptacle connector according to claim 2, wherein an inner wall of the insertion opening has a plurality of positioning portions, and each of the protruding portions is at the inner surface of the metallic shell and adjacent to a corresponding one of the positioning portions of the insertion opening.

4. The electrical receptacle connector according to claim 1, wherein the metallic shell has a plurality of leg portions, two side walls of the outer shell have a plurality of recessed portions, and each of the leg portions extends outwardly from a corresponding one of the recessed portions.

5. The electrical receptacle connector according to claim 1, wherein the side of the metallic shell has a mating groove, the mating groove is between the recessed holes, and the outer shell covers the mating groove.

6. The electrical receptacle connector according to claim 1, wherein each of the elastic pieces is in the receiving cavity and obliquely extends toward the insertion opening.

7. The electrical receptacle connector according to claim 1, wherein one end of each of the receptacle terminals is exposed out of the insertion opening.

* * * * *